United States Patent
Steiner

(10) Patent No.: US 12,275,468 B2
(45) Date of Patent: Apr. 15, 2025

(54) SCALLOP-RESISTANT TRACK LINK AND METHOD OF MAKING SAME

(71) Applicant: Caterpillar Inc., Peoria, IL (US)

(72) Inventor: Kevin Steiner, Tremont, IL (US)

(73) Assignee: Caterpillar Inc., Peoria, IL (US)

( * ) Notice: Subject to any disclaimer, the term of this patent is extended or adjusted under 35 U.S.C. 154(b) by 767 days.

(21) Appl. No.: 17/484,788

(22) Filed: Sep. 24, 2021

(65) Prior Publication Data

US 2022/0009569 A1    Jan. 13, 2022

Related U.S. Application Data

(62) Division of application No. 16/113,744, filed on Aug. 27, 2018, now Pat. No. 11,186,331.

(51) Int. Cl.
| | |
|---|---|
| B62D 55/21 | (2006.01) |
| B62D 55/06 | (2006.01) |
| C21D 1/18 | (2006.01) |
| C21D 9/00 | (2006.01) |

(52) U.S. Cl.
CPC .............. B62D 55/21 (2013.01); B62D 55/06 (2013.01); C21D 1/18 (2013.01); C21D 9/0087 (2013.01); *C21D 2221/00* (2013.01)

(58) Field of Classification Search
CPC .......... B62D 55/21; B62D 55/06; C21D 1/18; C21D 9/0087; C21D 2221/00
See application file for complete search history.

(56) References Cited

U.S. PATENT DOCUMENTS

| | | | |
|---|---|---|---|
| 3,955,855 A | 5/1976 | Massieon | |
| 7,040,080 B2* | 5/2006 | Okawa | B23P 15/00 |
| | | | 305/201 |
| 9,290,217 B2 | 3/2016 | Steiner | |
| 9,405,180 B2 | 8/2016 | Bowron | |
| 10,870,455 B2* | 12/2020 | Steiner | B62D 55/21 |
| 11,584,457 B2* | 2/2023 | Steiner | B62D 55/202 |
| 2003/0230069 A1 | 12/2003 | Okawa | |
| 2006/0043791 A1 | 3/2006 | Sho | |
| 2006/0181151 A1 | 8/2006 | Wodrich | |
| 2012/0286567 A1 | 11/2012 | Liu | |
| 2014/0083782 A1 | 3/2014 | Brewer | |
| 2014/0103703 A1 | 4/2014 | Wodrich | |

(Continued)

FOREIGN PATENT DOCUMENTS

| | | |
|---|---|---|
| CN | 104703868 | 6/2015 |
| CN | 105339247 | 2/2016 |

(Continued)

OTHER PUBLICATIONS

Japanese Official Notice of Rejection for Japan Patent Appln. No. 2021-510412, mailed Mar. 7, 2023 with English translation (8 pgs).

*Primary Examiner* — Jacob D Knutson

(57) ABSTRACT

A track link includes an elongate link body formed of a link body material that varies in hardness to form a first lower hardness zone, a second lower hardness zone, and a higher hardness zone. The higher hardness zone includes an upper rail surface of the elongate link body and extends substantially throughout the elongate link body outside of the first and second lower hardness zones, which surround the track pin bores. Related methodology for making a track link is also disclosed.

8 Claims, 4 Drawing Sheets

(56) References Cited

U.S. PATENT DOCUMENTS

2015/0008730 A1* 1/2015 Steiner .................. B62D 55/21
                                                            305/202
2018/0029653 A1   2/2018 Johannsen

FOREIGN PATENT DOCUMENTS

| | | | | |
|---|---|---|---|---|
| JP | 2004017782 | 1/2004 | | |
| KR | 100961501 | 6/2010 | | |
| WO | 2007108486 | 9/2007 | | |
| WO | WO-2007108486 A1 * | 9/2007 | ............. | B21K 23/02 |

* cited by examiner

SCALLOP-RESISTANT TRACK LINK AND METHOD OF MAKING SAME

TECHNICAL FIELD

The present disclosure relates generally to track systems in ground-engaging machines and, more particularly, to a track link having different hardness zones to retard scallop formation.

BACKGROUND

A wide variety of machines utilize tracks as ground-engaging propulsion elements, notably track-type tractors. It is common for such tracks to include a plurality of rotatable track-contacting elements, with each of two tracks at opposite sides of the machine forming endless loops moved about rotating components during operation. Such tracks typically each include two chains of coupled-together links, with bolted-on track shoes, and the links held together by way of track pins. The demands placed upon such machines and their associated tracks can be quite substantial with extremely high torsional loads, shearing loads, impacts, and still others. Machine tracks are commonly fairly robust to provide an operating life of hundreds, or even more preferably thousands, of hours despite significant stresses, strain, and wear.

In recent years, understanding and addressing wear phenomena in machine tracks has received considerable engineering attention. The various wear phenomena and wear rates experienced by machine track are typically a result of how the machine is used, the skill and experience of the operator, as well as the particular underfoot conditions and the substrate materials in the operating environment. Machines operated in sandy materials, for example, tend to wear certain components relatively more rapidly than machines used in predominately soil and/or clay, coal, or landfill waste environments. Field service life of machine track can thus vary based upon the factors mentioned above. Since machine track components can be relatively expensive to service and replace, not to mention the negatives of machine down time, engineering efforts in this field have often centered around reducing and managing wear between and among components. It has become well known, for example, that track links can wear according to a "scalloping" phenomenon where a center region of the track line wears relatively. U.S. Pat. No. 3,955,855 to Massieon et al. is directed to a track-type machine having track links with contact surfaces formed of relatively high wear-resistant material. The material is apparently a composite alloy metallurgically bonded to a base material of the track links.

SUMMARY OF THE INVENTION

In one aspect, a track for a ground-engaging machine includes a track chain assembly having a first track chain, and a second track chain extending in parallel with the first track chain, and each of the first track chain and the second track chain being formed by a plurality of track links. Each of the plurality of track links forming the first track chain and the plurality of track links forming the second track chain include an elongate link body having a first link body end with a first link strap and a second link body end with a second link strap. Each elongate link body includes a lower shoe-mounting surface, an upper-rail surface, a first inner surface defining a first track pin bore adjacent to the first link body end, and a second inner surface defining a second track pin bore adjacent to the second link body end. Each elongate link body is formed of a link body material that varies in hardness within the elongate link body to form a first lower hardness zone, a second lower hardness zone, and a higher hardness zone. The first lower hardness zone includes the first inner surface and extends circumferentially around the first track pin bore, the second lower hardness zone includes the second inner surface and extends circumferentially around the second track pin bore. The higher hardness zone includes at least a majority of the upper rail surface and extends throughout the elongate link body outside of the first lower hardness zone and the second lower hardness zone.

In another aspect, a track link for a track in a ground-engaging machine includes an elongate link body having a first link body end and a second link body end, a lower shoe-mounting surface, an upper rail surface, a first inner surface defining a first track pin bore adjacent to the first link body end, and a second inner surface defining a second track pin bore adjacent to the second link body end. The elongate link body is formed of a link body material that varies in hardness within the elongate link body to form a first lower hardness zone, a second lower hardness zone, and a higher hardness zone. The first lower hardness zone includes the first inner surface and extends circumferentially around the first track pin bore. The second lower hardness zone includes the second inner surface and extends circumferentially around the second track pin bore. The higher hardness zone includes at least a majority of the upper rail surface and extends throughout the elongate link body outside of the first lower hardness zone and the second lower hardness zone.

In still another aspect, a method of making a track link includes heat treating an elongate link body having a lower shoe-mounting surface and an upper rail surface such that a material extending throughout the elongate link body is hardened. The method further includes tempering the elongate link body such that a portion of the material that is hardened and forms a first and a second track pin bore in the elongate link body is softened. The method still further includes forming, by way of the heat treating and the tempering of the elongate link body, a scallop-retarding pattern of varying hardness where the elongate link body has a first lower hardness zone extending circumferentially around a first track pin bore, a second lower hardness zone extending circumferentially around a second track pin bore, and a higher hardness zone that includes the upper rail surface.

DETAILED DESCRIPTION

Figure 1:
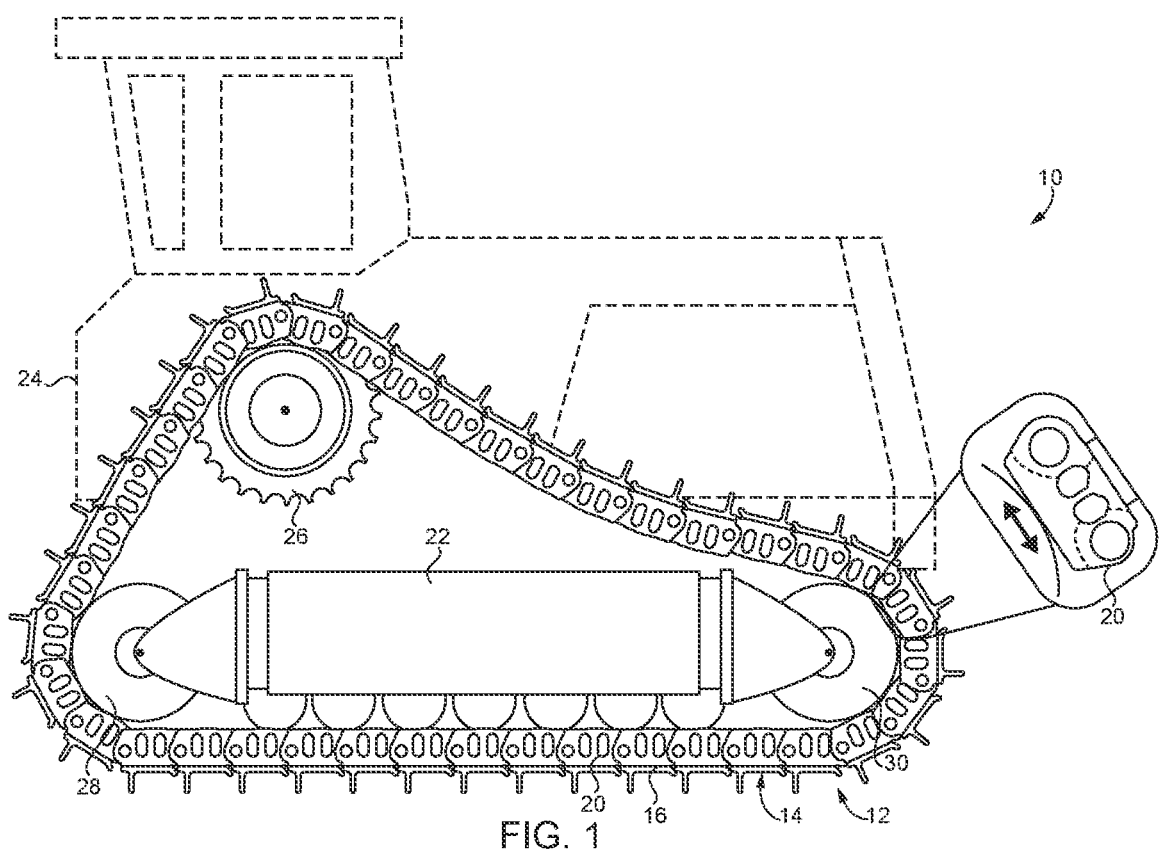
FIG. 1 is a side diagrammatic view of a machine having a track according to one embodiment, and including a detailed enlargement.

Referring to FIG. 1, there is shown a ground-engaging machine 10 including a track 12, according to one embodiment. It will be understood that track 12 is one track positioned at a first side of a frame 24 of machine 10, and a second, substantially identical track would be positioned at an opposite end of frame 24. Track 12 extends about a plurality of rotatable track-contacting elements. In the illustrated embodiment machine 10 includes a drive sprocket 26, a rear idler 28, and a front idler 30. A track roller frame 22 supports rear idler 28 and front idler 30. Those skilled in the art will recognize the so-called "high drive" configuration of track 12 in machine 10. It will be appreciated that other track configurations, such as an oval track configuration, would fall within the scope of the present disclosure. A plurality of additional rotatable track-contacting elements (not numbered) including track rollers, and carrier rollers, might be part of the overall system of which track 12 is a part. Ground-engaging machine 10 (hereinafter "machine 10") is shown in the context of a track-type tractor, but could be any of a variety of other machines such as a track loader, a half-track machine, or still another piece of off-highway equipment. FIG. 1 also includes a detailed enlargement illustrating a pattern of contact between front idler 30 and a track link 20, whereby sliding contact of parts of idler 30 with track link 20 occurs as track 12 advances about front idler 30. This sliding contact has been observed to produce certain forms of wear that can limit track service life, known generally in the art as scalloping. Analogous wear can occur based upon engagement and disengagement of track 12 with rear idler 28. As will be further apparent from the following description, track 12 is uniquely configured to address certain wear phenomena and thus extended service life over other known designs.

Figure 2:
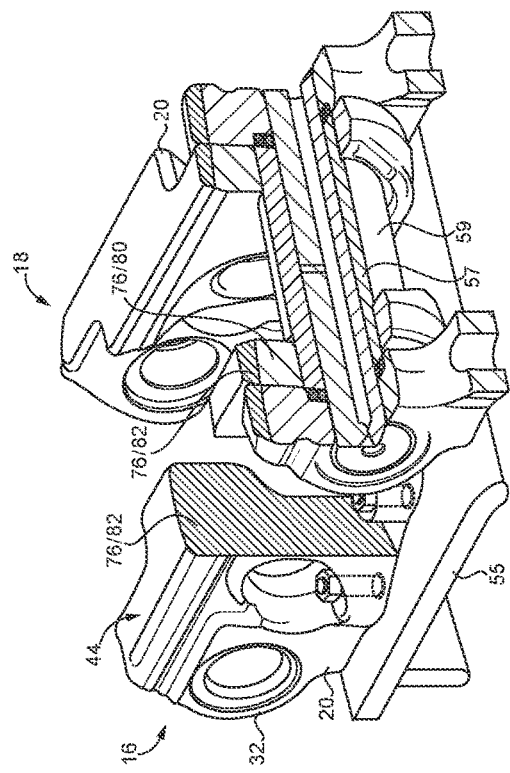
FIG. 2 is a sectioned diagrammatic view of a track, in multiple section planes, according to one embodiment.
Figure 3:
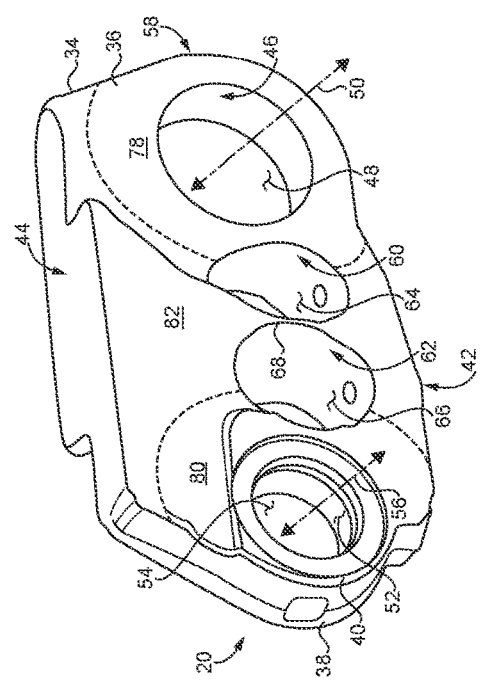
FIG. 3 is a diagrammatic view of a track link, according to one embodiment.

Referring also now to FIG. 2, track 12 includes a track chain assembly 14 having a first track chain 16, and a second track chain 18 extending in parallel with first track chain 16. Each of first track chain 16 and second track chain 18 is formed by a plurality of track links 20. Each of the plurality of track links 20 forming first track chain 16 and the plurality of track links 20 forming second track chain 18 includes an elongate link body 32. Referring also to FIG. 3, each elongate link body 32 has a first link body end 34 with a first link strap 36 and a second link body end 38 with a second link strap 40. Each elongate link body 32, hereinafter referred to in the singular, includes a lower shoe-mounting surface 42, an upper rail surface 44, a first inner surface 46 defining a first track pin bore 48 and a second inner surface 52 defining a second track pin bore 54. First track pin bore 48 has a center axis 50 and is adjacent to first link body end 34. Second track pin bore 54 has a center axis 56 and is adjacent to second link body end 38. A general construction of track chains 16 and 18 is also shown in FIG. 2, illustrating a track pin 57 that supports a rotating bushing 59 and couples together track chains 16 and 18. In other track designs rotating bushings are not used.

In the track drive configuration depicted in FIG. 1, rotation of drive sprocket 26 causes sprocket 26 to engage successively about rotating bushings associated with each track pin 57, or with track pins directly, causing track 12 to move about the several rotatable track-contacting elements in a forward direction or a reverse direction. Embodiments are contemplated as shown where each track link 20 in one of track chains 16 and 18 is "left handed" while each track link 20 in the other one of track chains 16 and 18 is "right handed", thus the track links 20 in the respective track chain 16 and 18 can be mirror images of one another. Track links 20 can have a serpentine or zigzag configuration. Embodiments are also contemplated where all of track links 20 are identical in both track chains 16 and 18 and/or neither left handed, or right handed, such as where track links 20 are straight, or still other configurations might be used within the present context. As noted above, track link 20 is uniquely configured to address certain wear phenomena. To this end, elongate link body 32 is formed of a link body material 76 that varies in hardness within elongate link body 32 according to a scallop-retarding pattern. The varying hardness forms a first lower hardness zone 78, a second lower hardness zone 80, and a higher hardness zone 82. First lower hardness zone 78 includes first inner surface 46 and extends circumferentially around first track pin bore 48. Second lower hardness zone 80 includes second inner surface 52 and extends circumferentially around second track pin bore 54. Higher hardness zone 82 includes at least a majority of upper rail surface 44 and extends throughout elongate link body 32 outside of first lower hardness zone 78 and second lower hardness zone 80. Extending throughout means that the subject higher hardness zone 82 is pervasive in elongate link body 32 apart from lower hardness zones 78 and 80, such that substantially all, such as at least 80-90% of elongate link body 32 except those parts that are within lower hardness zones 78 and 80, is part of higher hardness zone 82. Elongate link body 32 further includes a third inner surface 60 and a fourth inner surface 62 forming a first bolting window 64 and a second bolting window 66, respectively. Bolting window 64 and bolting window 66 are located longitudinally between first track pin bore 48 and second track pin bore 54. A strut 68 extends between first bolting window 64 and second bolting window 66. First lower hardness zone 78 may include a portion of third inner surface 60, and second lower hardness zone 80 may include a portion of fourth inner surface 62. Higher hardness zone 82 may include strut 68.

As discussed above, engagement and disengagement of rotating track-contacting components in a track system that engage and disengage track links 20, in particular rail surfaces, can produce a wear phenomenon known in the art as scalloping. It has been observed that certain techniques such as providing hardened material in the areas of sliding contact, providing extra, sacrificial wear material at selected locations, and still other strategies, can reduce the tendency for scalloping to occur and thus extend track service life. It can be seen from FIG. 3 that an entirety of upper rail surface 44 is included in higher hardness zone 82. At least a majority of upper rail surface 44 is within higher harness zone 82 in most embodiments. Accordingly, when track link 20 is first placed in service all of upper rail surface 44 can include relatively hard and wear-resistant material. Over the course of service life of track link 20, however, even the relatively hard material initially forming upper rail surface 44 will begin to wear away. It can be noted from FIG. 3 that first lower hardness zone 78 and second lower hardness zone 80 are beneath higher hardness zone 82 along a full extent of upper rail surface 44. As the relatively hard material of higher hardness zone 82 wears away, eventually the softer material of lower hardness zones 78 and 80 will be exposed. What may be observed is an initial relatively mild scalloping phenomenon as wear of upper rail surface 44 initially proceeds according to a conventional pattern, concentrating material of wear toward the middle of elongate link body 32. Once the relatively higher hardness material of higher hardness zone 82 wears away to expose the softer material of lower hardness zones 78 and 80, the less wear resistant softer material will begin to be sacrificed at a relatively faster rate, hastening wear adjacent to or upon link straps 36 and 40 in a manner that compensates for the scalloping that tends to occur more in a middle portion of upper rail surface 44.

Figure 5:
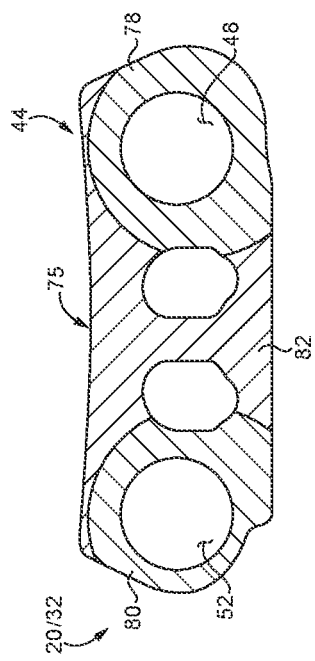
FIG. 5 is a sectioned side diagrammatic view of a track link in an earlier state of wear, according to one embodiment.

Referring also now to FIG. 5, there is shown track link 20 where some wear in the nature of scalloping has occurred, such that a relatively shallow scallop 75 is formed generally at or about a longitudinal midpoint of upper rail surface 44. It will be recalled that the tendency for an idler to slide into and out of contact with track link 20 can cause wear to be biased toward the middle part of the track link 20, between the opposite link ends, approximately as shown in FIG. 5.

Figure 6:
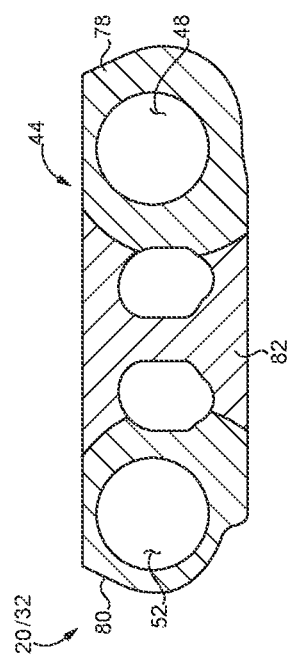
FIG. 6 is a sectioned side diagrammatic view of a track link in a later state of wear, according to one embodiment.

Referring also to FIG. 6, there is shown track link 20 where elongate link body 32 has worn further, such that the relatively softer material of lower hardness zones 78 and 80 has been exposed and wear in those areas has accelerated. As a result, upper rail surface 44 has returned to a more or less flat state, approximately as it appears prior to being placed in service, since the greater wear rate toward ends of the link has allowed wear to catch up in those regions. It should be appreciated that the illustrations in FIG. 5 and FIG. 6 are illustrative only and do not necessarily reflect an actual wear pattern that might be observed. In any event, as wear continues past a desired state, eventually the associated machine will be idled for service and track 12 along with potentially other undercarriage system components will be replaced. It has been observed that scalloping of track links 20 is a factor limiting service life not only because material can eventually be worn away beyond the point at which acceptable operation and performance can be achieved, but also due to decreased operator comfort. In some instances, scalloping can become sufficiently severe that operators can no longer comfortably operate the associated machine. It is expected that applying the teachings of the present disclosure to existing track systems can improve service life of a track more than 20%, and potentially more than 30% more than what can otherwise be expected due to improvements in operator comfort.

INDUSTRIAL APPLICABILITY

Figure 4:
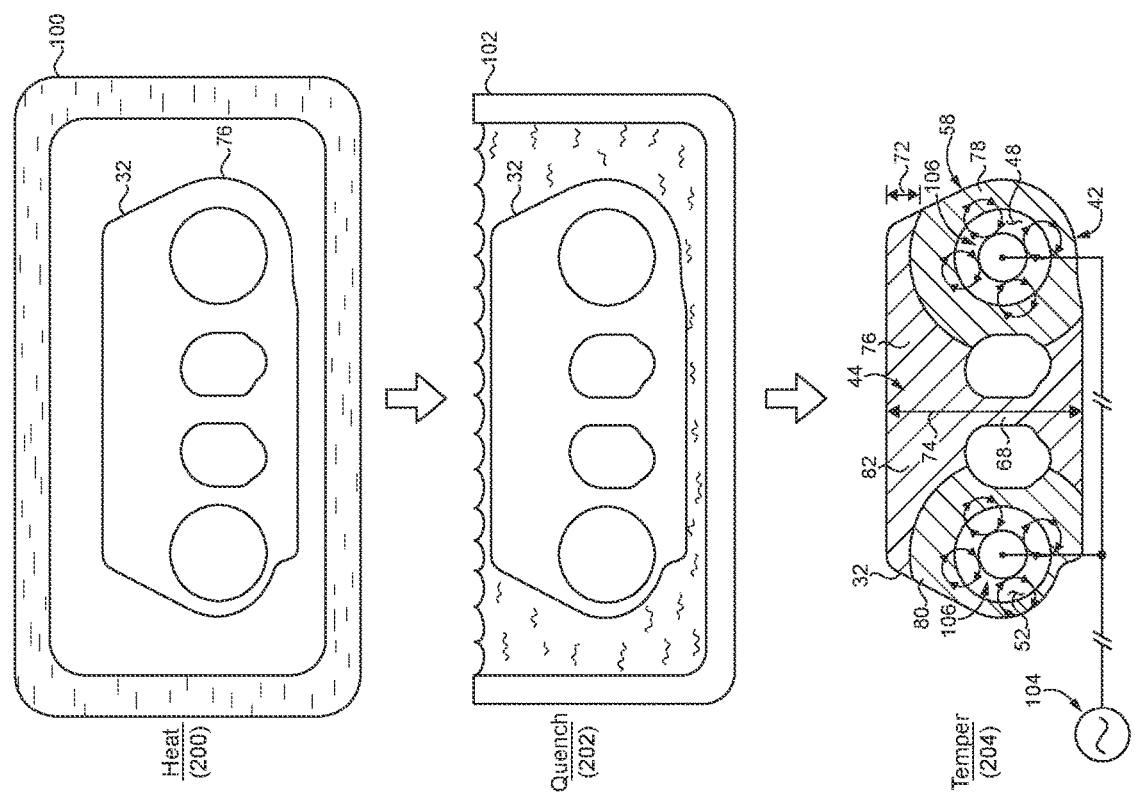
FIG. 4 is a diagrammatic view showing stages in making a track link, according to one embodiment.

Referring to the drawings generally, but now in particular to FIG. 4, there are shown stages in methodology for making a track link 20 according to the present disclosure. Making track link 20 can include heat treating elongate link body 32 such that material, extending throughout elongate link body 32, is hardened. Material of which elongate link body 32 is made can include an iron or a steel, shown by way of reference numeral 76. In FIG. 4 an initial heat stage 200 can include placing elongate link body 32 within a furnace or the like 100 for a period of time sufficient to heat elongate link body 32 substantially uniformly. Heat treats temperatures and process conditions to achieve hardness and other material properties suitable for application in the present context are routine. From heat stage 200 processing can advance to a quench stage 202 where elongate link body 32 is liquid quenched. Heat treating elongate link body 32 by way of heat stage 200 and quench stage 202 can include hardening material 76 extending throughout elongate link body 32 to a hardness greater than 50 HRC (Rockwell C hardness scale). Link body material 76 can have a hardness after quench stage 202 of about 55 HRC or greater. From quench stage 202 processing can advance to a temper stage 204 where a tempering apparatus 104 is employed to position heating elements 106, such as inductive heating elements, within first track pin bore 48 and second track pin bore 52. At temper stage 204 tempering of elongate link body 32 is performed such that a portion of link body material 76 that is hardened from heat stage 200 and quench stage 202, and forms first and second track pin bores 48 and 52, is softened. Tempering apparatus 104 and specifications suitable for application in the present context are routine. After tempering elongate link body 32 to soften link body material 76 that forms track pin bores 48 and 52, processing of track link 20 can advance to final machining. Tempering of elongate link body 32 can include softening the subject link body material 76 to a hardness less than 50 HRC. The softening can further include softening the subject link body material 76 to a hardness of about 45 HRC or less. The processing stages depicted in FIG. 4 enable forming, by way of the heat treating and tempering of elongate link body 32, the scallop-retarding pattern of varying hardness. Accordingly, when temper stage 204 is completed, link body material 76 may have a hardness greater than 50 HRC within higher hardness zone 82, and potentially about 55 HRC or greater. Link body material 76 may have a hardness less than 50 HRC in each of first lower hardness zone 78 and second lower hardness zone 80, and potentially about 45 HRC or less within each of lower hardness zones 78 and 80.

Certain earlier strategies employed a greater number of processing stages than that which can be employed in accordance with the present disclosure. For instance, it was previously known to heat treat link bodies to harden them, followed by softening the entirety of the link body, and then selectively rail hardening the upper rail surface 44. It will be appreciated that the present disclosure can provide an efficiency gain over such prior strategies given that only one heat-treating procedure and one tempering procedure can be employed to produce a piece suitable for final machining.

Certain other features made possible in part by the present disclosure are also evident from the depiction of elongate link body 32 at temper stage 204 in FIG. 4. In particular, it can be seen that higher hardness zone 82, as shown by the consistent sectioning, includes at least a portion of lower shoe-mounting surface 42. It can also be noted that elongate link body 32 has an outer perimetric surface 58 that forms a boundary. Outer perimetric surface 58 includes upper rail surface 44 and lower shoe-mounting surface 42. First lower hardness zone 78 and second lower hardness zone 80 together form a negative image of higher hardness zone 82 within the boundary formed by outer perimetric surface 58. It can still further be noted that a greater depth 74 of higher hardness zone 82 is formed from upper rail surface 44 to lower shoe-mounting surface 42, at a longitudinal location between first and second track pin bores 48 and 52. A lesser depth 72 of higher hardness zone 82 is formed and extends from upper rail surface 44 to first and second lower hardness zones 78 and 80 at longitudinal locations of first and second track pin bores 48 and 52. Depth 72 may be about 20 millimeters or less. As used herein, the term "about" can be understood in the context of conventional rounding to a consistent number of significant digits. Accordingly, "about 20" means from 15 to 24.5, and so on. It will still further be noted that an arcuate interface 70 is formed by each of first lower hardness zone 78 and second lower hardness zone 80 with higher hardness zone 82. Arcuate interfaces 70, which in the illustrated embodiment are discontinuous and separated by higher hardness zone 82, can be understood to include peaks (not numbered) positioned substantially at the same longitudinal locations as the axes 50 and 56 of track pin bores 48 and 54. Such peaks may be also be understood as peaks of first and second lower hardness zones 78 and 80. Depth 72 may be measured, in a new link not yet placed in service, from upper rail surface 44 to the peaks.

Arcuate interfaces 70 can be circular, or partially circular, and generally extend circumferentially around axes 50 and 56 at constant radial distances. In other instances, tempering of elongate link body 32 could include driving heat into the material being tempered at a varying radial distance. In other words, rather than a generally circular or semicircular shaped boundary (arcuate interfaces 70) of lower hardness zones 78 and 82, in other instances a non-circular boundary might be formed by manipulating the inductive heating (or other heating process) by way of known techniques. It can also be appreciated that depth 72 can be made greater or less depending upon the manner in which wear is desired to progress. Track links 20 could be designed with the shape and/or depth of the relatively harder link body material 76 overlaying the relatively softer link body material 76 in a manner that is tailored for certain environments, operating conditions, machine applications, and substrate materials.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of making a track link comprising:
   heat treating an elongate link body having a lower shoe-mounting surface and an upper rail surface such that a material extending throughout the elongate link body is hardened;
   tempering the elongate link body such that a portion of the material that is hardened and forms a first and a second track pin bore in the elongate link body is softened;
   forming, by way of the heat treating and the tempering of the elongate link body, a scallop-retarding pattern of varying hardness where the elongate link body has a first lower hardness zone extending circumferentially around the first track pin bore, a second lower hardness zone extending circumferentially around the second track pin bore, and a higher hardness zone that includes the upper rail surface; and
   the upper rail surface extending longitudinally in the elongate link body, and the higher hardness zone extending in a first longitudinal direction to a first higher hardness zone end and in a second longitudinal direction to a second higher hardness zone end, and the first higher hardness zone end and the second higher hardness zone end being located longitudinally outward of a first center axis defined by the first track pin bore and a second center axis defined by the second track pin bore, respectively.

2. The method of claim 1 wherein the heat treating of the elongate link body includes hardening the material extending throughout the elongate link body to a hardness greater than 50 HRC.

3. The method of claim 2 wherein the tempering of the elongate link body includes softening the material that is hardened to a hardness less than 50 HRC.

4. The method of claim 3 wherein the forming of the scallop-retarding pattern of varying hardness further includes:
   forming a greater depth of the higher hardness zone from the upper rail surface to the lower shoe-mounting surface at a longitudinal location between the first and the second track pin bores; and
   forming a lesser depth of the higher hardness zone that extends from the upper rail surface to the first and the second lower hardness zones at longitudinal locations of the first and the second track pin bores, respectively.

5. The method of claim 4 wherein the lesser depth is about 20 millimeters or less.

6. The method of claim 4 wherein each of the first lower hardness zone and the second lower hardness zone forms an arcuate interface with the higher hardness zone.

7. The method of claim 1 wherein the elongate link body includes an outer perimetric surface that includes the upper rail surface and the lower shoe-mounting surface, and further comprising forming the first lower hardness zone and the second lower hardness zone as a negative image of the higher hardness zone within a boundary formed by the outer perimetric surface.

8. The method of claim 1 wherein the first higher hardness zone end and the second higher hardness zone end include a first track link surface and a second track link surface, respectively, each extending downwardly from the upper rail surface.

* * * * *